United States Patent [19]
Deichman

[11] Patent Number: 5,078,346
[45] Date of Patent: Jan. 7, 1992

[54] PIPE SUPPORTS

[76] Inventor: Mack Deichman, 209 Sondrol, Ames, Iowa 50010

[21] Appl. No.: 542,909

[22] Filed: Jun. 25, 1990

[51] Int. Cl.[5] .............................................. F16L 3/00
[52] U.S. Cl. .................................... 248/351; 248/49; 248/59
[58] Field of Search ...................... 248/59, 58, 49, 65, 248/346, 351; 273/33

[56] References Cited

U.S. PATENT DOCUMENTS

| | | | |
|---|---|---|---|
| 1,761,532 | 6/1930 | Morris | 273/33 X |
| 1,780,188 | 11/1930 | Hildebrandt et al. | |
| 2,106,956 | 2/1938 | Nakamura | 248/49 |
| 2,304,973 | 12/1942 | Vecchiola | 248/58 |
| 2,352,145 | 6/1944 | Wright | 248/58 |
| 2,765,000 | 10/1956 | Bond | 138/65 |
| 2,862,714 | 12/1958 | Smith | 273/33 X |
| 2,934,348 | 4/1960 | Magida | 273/33 X |
| 3,122,346 | 2/1964 | Seiler | 248/62 |
| 3,185,758 | 5/1965 | Litz | 174/40 |
| 3,980,262 | 9/1976 | Lee | 248/65 |
| 4,017,046 | 4/1977 | Hicks | 248/55 |
| 4,158,541 | 6/1979 | Klechkla et al. | 432/116 |
| 4,852,831 | 8/1989 | Sandstrom | 248/58 |

Primary Examiner—Alvin C. Chin-Shue
Attorney, Agent, or Firm—Zarley, McKee, Thomte, Voorhees & Sease

[57] ABSTRACT

An insert device for use with pipe hanger saddles which fold pipes normally surrounded by a bat of insulation in a suspended position. The insert device prevents the weight of the pipe against the saddle causing insulation damage which in turn allows condensation to form. The insert device as a flexible base portion adapted for conforming relationship to the bat of insulation and the upstanding rigid insert which is inserted through the insulation against the pipe. As a result, the pipe is held without the load bearing weight of the pipe and its contained fluid being supported against the bat of insulation.

2 Claims, 1 Drawing Sheet

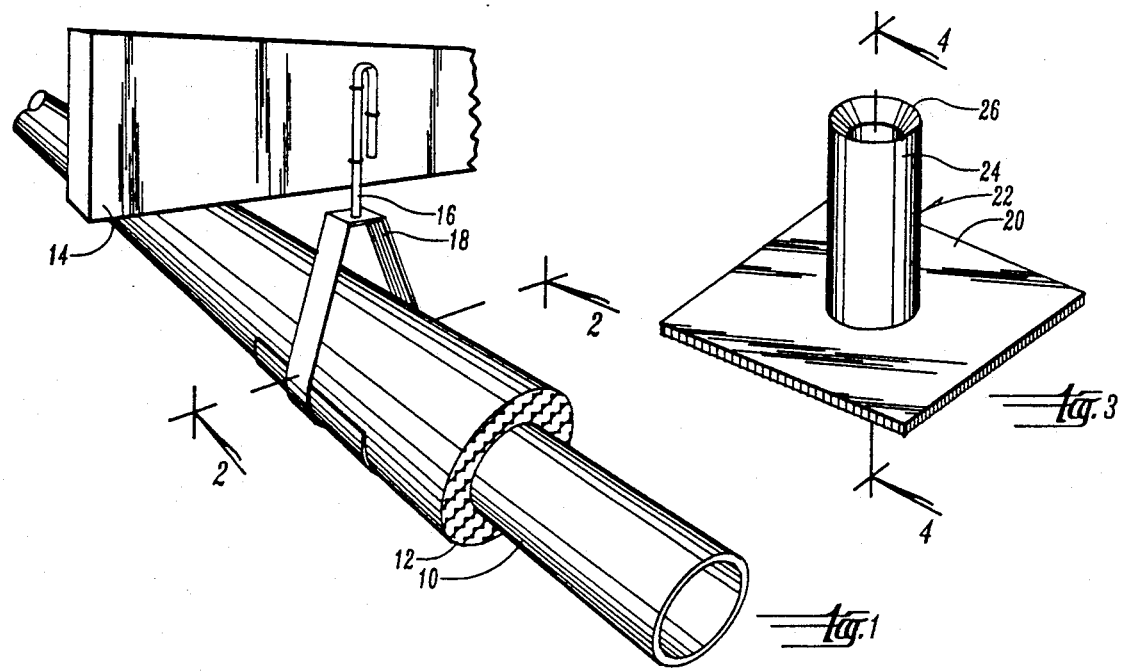
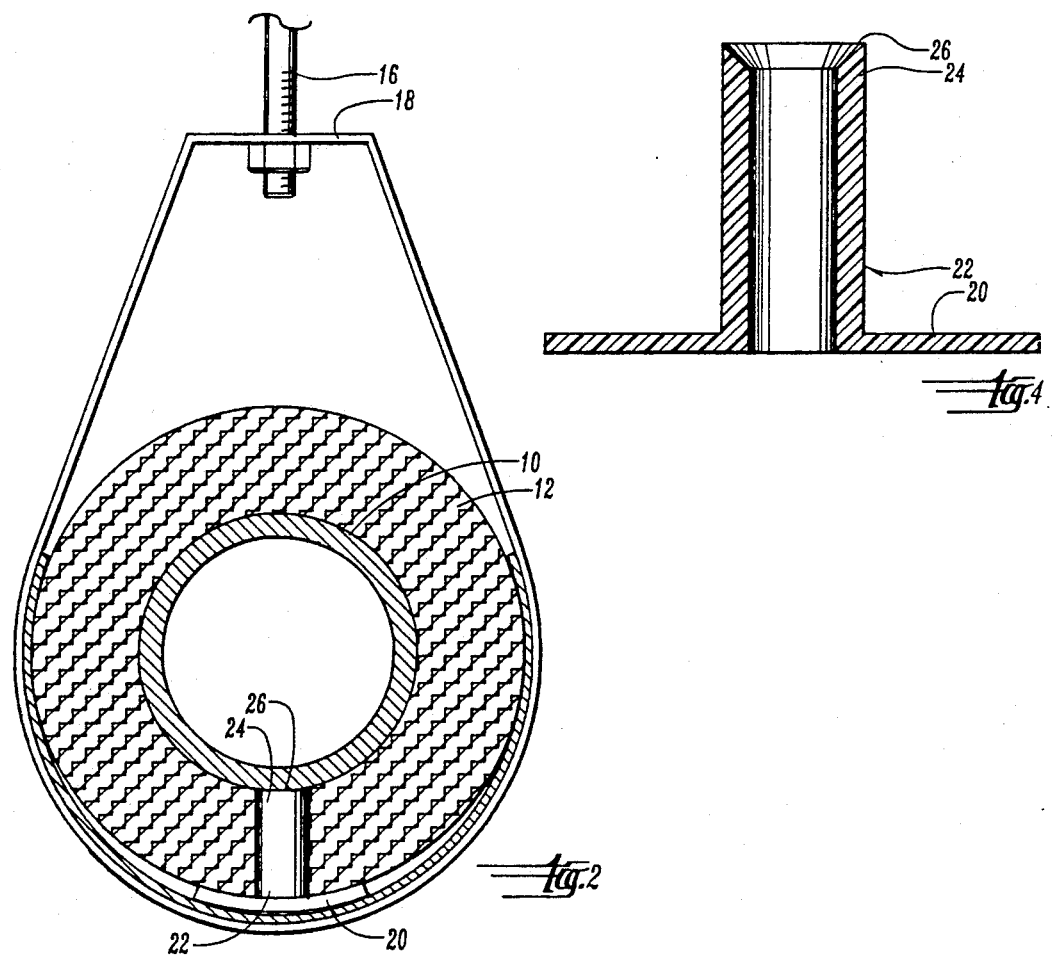

PIPE SUPPORTS

BACKGROUND OF THE INVENTION

This invention relates to a simple but useful device for use in conjunction with building both commercial structures and residential structures. In such buildings it is common to suspend pipes from ceiling rafters. The pipes are normally used to convey hot or cold fluids. However, because condensation often forms on pipes due to the difference in ambient temperature and the temperature of the fluid conveyed within the pipe, such pipes are normally wrapped with a bat of insulation. The theory is that the insulation will prevent condensation caused by the drastic temperature change between ambient air and the fluid in the pipe. Thus, condensation can be avoided. It is, of course, necessary to avoid condensation and dripping which results from heavy condensation since this can cause damage to floors and ceilings. And so it is that in the normal operation, pipes designed for carrying liquids are typically enshrouded with a bat of insulation. The pipe is then hung in a conventional hanger saddle to hold it in its suspended position.

Problems arise because of this manner of suspension. In particular, the hanger saddle will normally hang from the rafters by means of a hanger or suspension strap which holds the pipe and bat of insulation assembly in its suspended position. However, in doing so, the weight bearing load of the pipe, and the fluid in the pipe, bears against the bat of insulation precisely at the point of suspension or hanging. This often can be a substantial weight load. As a result, the bat of insulation is often compressed, sometimes significantly damaged and opened to allow exposure to ambient air. This in turn allows condensation to form by reason of the fracture of the shroud of insulation. As a result hanger assemblies while needed also cause damage from time to time to the insulation and in effect defeat the very objective of the insulation.

There have been from time to time attempts to devise supports for use in conjunction with hanger saddles which would take the load bearing weight off of the insulation. However, those that have been devised in the past are expensive, cumbersome, difficult to insert, and usually have not been successful in accomplishing the objectives of satisfactory pipe support, avoidance of weight bearing load on the insulation, and at the same time being inexpensive and easy to install.

This invention has as its objective the fulfillment of the above-mentioned need. The means of accomplishing this and other objectives will become apparent from the detailed description of the invention which follows hereinafter.

BRIEF DESCRIPTION OF THE DRAWINGS

FIG. 1 shows a perspective view of a pipe in a hanger saddle suspended from a rafter.

FIG. 2 shows a sectional view through the suspended pipe and hanger saddle of FIG. 1 along line 2—2 thereof.

FIG. 3 shows a perspective view of the insert device of the present invention.

FIG. 4 shows a sectional view of the device of the present invention along line 4—4 of FIG. 3.

SUMMARY OF THE INVENTION

A simple but useful insert device for use with pipe hanger assemblies so that the hanging assembly does not damage the bat of insulation surrounding the fluid conveying pipe therein. The insert device comprises a firm but yet flexible base portion which is capable of conforming relationship to the arcuate shape of the bat of insulation, and the upstanding rigid insert support adapted for easy pushing or imbedding into the bat of insulation. The flexible base covers the insert hole after installation, and the rigid support holds the weight bearing load of the pipe at the point of suspension in the hanger saddle assembly.

DETAILED DESCRIPTION OF THE INVENTION

Referring particularly to FIG. 1, a fluid conveying pipe 10 is shown in its normal surrounded relationship with a bat of insulation 12. Pipe 10 is of course adapted for carrying hot or cold fluids and as such when exposed to ambient air causes condensation because the temperature differential between pipe 10 and the fluid therein and the ambient air. Bat of insulation 12 is designed, of course, to prevent this condensation. In typical construction fashion the pipe and insulation assembly is suspended from rafter 14 in conventional fashion. As depicted in FIG. 1, the suspension is via hook 16 in conjunction with associated hanger strap 18. The strap assembly 16 and 18 is referred to as a hanger saddle. As can be seen from FIG. 1, at the precise point that strap 18 passes underneath the pipe and bat of insulation assembly, the load of weight of the pipe, the fluid in the pipe and for that matter the insulation is all carried against the insulation 12. As a result, there is significant potential for damage to the bat of insulation 12 caused by compression and fracture or rupture of the integrity of the bat of insulation.

The insert device of the present invention is illustrated in a perspective view in FIG. 3. It comprises a firm but flexible base insert portion 20 and generally mounted thereon in perpendicular relationship thereto an upstanding rigid insert 22. Rigid insert 22 is preferably of cylindrical configuration with one end mounted or integrally formed with base 20 and with the opposite end portion 24 terminating in a beveled edge 26. Beveled edge 26 is relatively sharp and has the capability of functioning as a knife edge. The height of cylindrical portion 22 is generally of a height equal to the thickness of the bat of insulation 12.

The insert device of FIG. 3 is shown in its in use position in FIG. 2. In particular, while pipes are being suspended it is used in the following manner. The point of suspension is determined. Insert device of FIG. 3, once it is known where suspension hanger 18 will be located, is pushed against the underportion of the bat of insulation 12 such that edge 26 pushes through the bat of insulation until it abuts against the circumference of pipe 10 as illustrated in FIG. 2. Because of sharp edge 26 the bat of insulation 12 is pierced neatly and cleanly. Correspondingly, because the dimension, that is the vertical dimension of rigid insert support 22 corresponds with the thickness of the bat of insulation 12, base portion 20 comes to rest against the exterior of the bat of insulation 12. At the same time that it does this, since it is flexible, it conforms to the generally arcuate configuration of the bat of insulation 12 and sits in covering relationship to the pierced hole in bat of insulation 12 caused by insertion of the insert device itself. Thereafter, the pipe and bat of insulation assembly is hung in a manner illustrated in FIG. 2. As can be seen in FIG. 2, the weight bearing load of pipe 10 and any fluid that is contained therein is supported not against the bottom of the insulation, but instead is supported by the cylindrical upstanding rigid support 22. Moreover, the risk of condensation and dripping damage caused on ceilings, floors, etc. is eliminated because the integrity of bat of insulation 12 is maintained to effectively allow insulation from ambient air and thus prevent condensation.

The insert device of the present invention can be made from a variety of materials. Preferably it is polymeric plastic material such a polypropylene, mixed polymers of propylene and ethylene, polyvinyl chloride, etc. They can be conveniently packaged in large quantities and shipped to any commercial or residential construction site where needed. It can therefore be seen that the device of the present invention while simple of construction is highly useful and allows an operational method of suspension of ceiling pipes which does not provide any significant damage to the bat of insulation surrounding a fluid conveying pipe, and which is easy to use, and requires little time or operator skill to install.

What is claimed is:

1. An insert for use with a pipe hanger saddle comprising:
   a firmly yet flexible base portion capable of conforming to the arcuate shape of a bat of insulation; and
   mounted upon said base portion, an upstanding rigid hollow, cylindrical insert support having a base end portion and a top end portion with the top end portion terminating in a sharpened, beveled edge for easy pushing insertion into a bat of insulation, so that a pipe enshrouded with said insulation may be rigidly supported in said hanger saddle without damage to bat of insulation.

2. The insert of claim 1 which is made of polymeric plastic.

* * * * *